United States Patent
Udell et al.

(10) Patent No.: US 7,056,094 B2
(45) Date of Patent: Jun. 6, 2006

(54) ROTOR AND A RETAINING PLATE FOR THE SAME

(75) Inventors: David C Udell, Derby (GB); Alan Kee, Nottingham (GB)

(73) Assignee: Rolls-Royce, PLC, London (GB)

( * ) Notice: Subject to any disclaimer, the term of this patent is extended or adjusted under 35 U.S.C. 154(b) by 49 days.

(21) Appl. No.: 10/747,585

(22) Filed: Dec. 30, 2003

(65) Prior Publication Data
US 2004/0151591 A1    Aug. 5, 2004

(30) Foreign Application Priority Data
Jan. 30, 2003    (GB) ................................. 0302116.9

(51) Int. Cl.
*F01D 5/32* (2006.01)
(52) U.S. Cl. .............................. 416/220 R; 416/219 R
(58) Field of Classification Search ............ 416/220 R, 416/219 R, 221, 218
See application file for complete search history.

(56) References Cited

U.S. PATENT DOCUMENTS

| | | | | |
|---|---|---|---|---|
| 3,023,998 A | * | 3/1962 | Sanderson, Jr. | 416/220 R |
| 3,656,865 A | * | 4/1972 | Spears, Jr. | 416/220 R |
| 4,566,857 A | * | 1/1986 | Brumen | 416/220 R |
| 4,730,983 A | * | 3/1988 | Naudet et al. | 416/220 R |
| 6,234,756 B1 | * | 5/2001 | Ress et al. | 416/220 R |
| 6,439,851 B1 | * | 8/2002 | Wong | 416/219 R |
| 6,488,473 B1 | * | 12/2002 | Lee et al. | 416/220 R |

FOREIGN PATENT DOCUMENTS

| EP | 0 761 930 A1 | 3/1997 |
|---|---|---|
| GB | 782181 | 9/1957 |

* cited by examiner

*Primary Examiner*—Edward K. Look
*Assistant Examiner*—Richard A. Edgar
(74) *Attorney, Agent, or Firm*—Oliff & Berridge, PLC

(57) ABSTRACT

A rotor (30) comprises a disc (50) for rotating about an axis, supporting a plurality of radially extending blades (40) in slots (52) therein. At least one retaining plate (60), having a radially outer edge (62), is received by a channel (48, 58) formed by the disc (50) and at least one blade (40). The blade (40) and disc (50) are contiguous in the channel (48, 58) at first (55) and second (57) distinct parts of the disc (50), and the radially outer edge (62) of the retaining plate (60) has at least one indentation (64) aligned with a first part (55) of the disc (50).

8 Claims, 3 Drawing Sheets

ROTOR AND A RETAINING PLATE FOR THE SAME

BACKGROUND

Embodiments of the present invention relate to a rotor. In particular, they relate to rotors within a gas turbine engine.

Some parts of a gas turbine engine are highly stressed during operation of the engine. Those parts are engineered to withstand that stress. This often means those parts must be made more substantial to withstand the stress. This may result in an overall increase in engine weight and a decrease in engine efficiency. In addition, a heavily stressed part may have a reduced useful life which also reduces engine efficiency.

It would be desirable to improve the efficiency and reduce the weight of a gas turbine engine, particularly those used in aeroplane jet engines.

Currently, gas turbine engines comprise a number of rotors. A rotor may be assembled by slotting rotor blades into slots of a supporting disc connected to a shaft. Posts of the supporting disc prevent radial movement of the rotor blades. The rotor blades and the posts of the supporting disc in combination create a channel into which a retaining plate is inserted. The retaining plate prevents axial movement of the rotor blades.

SUMMARY

The inventors have recognised that when the engine is in use the centrifugal force on the retaining plate pushes it into the posts of the supporting disc. This increases the stress within the posts, particularly at the acute angle formed when off-axis slots are used.

The inventors have devised a way of reducing such stress without significantly adding to the complexity of the component parts or the assembly of the engine.

According to one aspect of the present invention, a retaining plate for a rotor has a radially outer edge, the radially outer edge having at least one indentation.

According to a further aspect of the invention, a rotor comprises a disc having an axis about which it is able to rotate, the disc supporting a plurality of radially extending blades in slots therein, a channel being defined by the disc and at least one blade, the or each blade and the disc being contiguous in the channel at first and second distinct parts of the disc, and the rotor further comprises at least one retaining plate as described in the preceding paragraph.

BRIEF DESCRIPTION OF THE DRAWINGS

For a better understanding of the present invention reference will now be made by way of example only to the accompanying drawings in which.

DETAILED DESCRIPTION OF EMBODIMENTS

Figure 1:
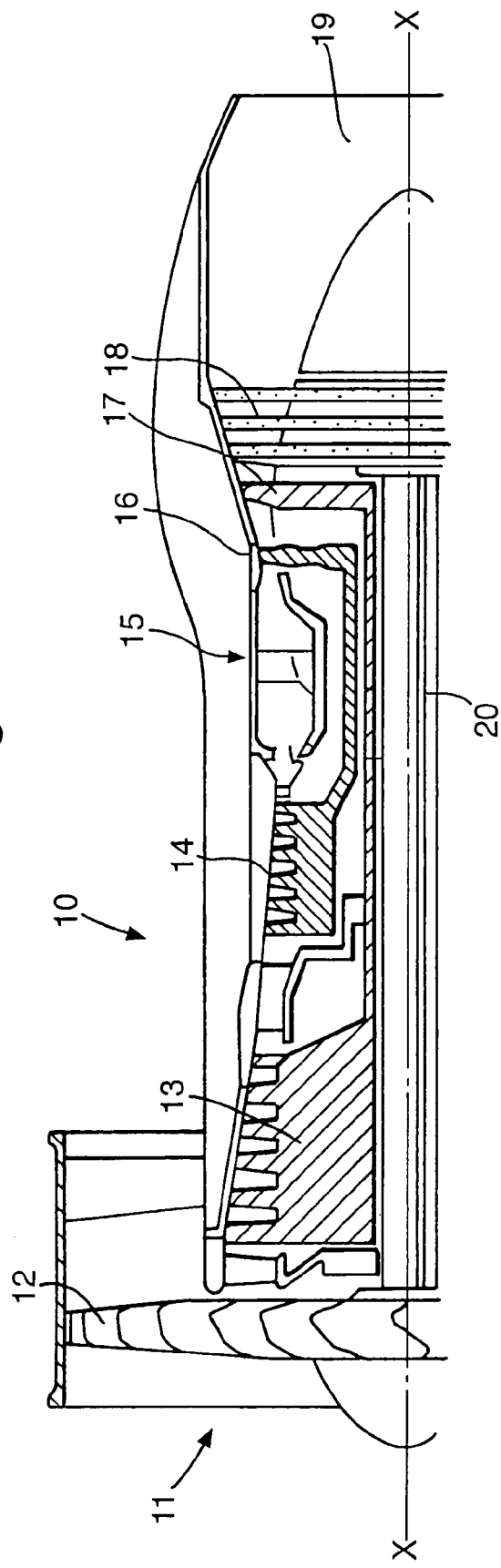
FIG. 1 illustrates a sectional side view of the upper half of a gas turbine engine.

FIG. 1 illustrates a sectional side view of the upper half of a gas turbine engine 10. The gas turbine engine comprises, in axial flow series about an axis X—X, an air intake 11, a propulsive fan 12, an intermediate pressure compressor 13, a high pressure compressor 14, a combustor 15, a turbine arrangement comprising a high pressure turbine 16, an intermediate pressure turbine 17, a low pressure turbine 18 and an exhaust nozzle 19.

The gas turbine engine 10 operates in a conventional manner so that air entering in the intake 11 is accelerated by the propulsive fan 12 which produces two air flows: a first air flow into the intermediate pressure compressor 13 and a second air flow which provides propulsive thrust. The intermediate pressure compressor 13 compresses air flow directed into it for delivering that air to the high pressure compressor 14 where further compression takes place. The compressed air exhausted from the high pressure compressor 14 is directed into the combustor 15 where it is mixed with fuel and the mixture combusted. The resultant hot combustion products then expand and thereby drive the high, intermediate and low pressure turbines 16, 17, 18 before being exhausted through the nozzle 19 to provide additional propulsive thrust. The high, intermediate and low pressure turbines 16, 17, 18 respectively drive the high and intermediate pressure compressors 14, 13 and the propulsive fan 12 by suitable interconnecting shafts 20.

The high, intermediate and low pressure turbines 16, 17, 18 respectively operative at rotational speeds of approximately 12000 rpm, 800 rpm and 3300 rpm.

The high, intermediate and low pressure turbines 16, 17, 18, the propulsive fan 12 and the intermediate pressure compressor 13 and the high pressure compressor 14 are each rotors.

Figure 2A:
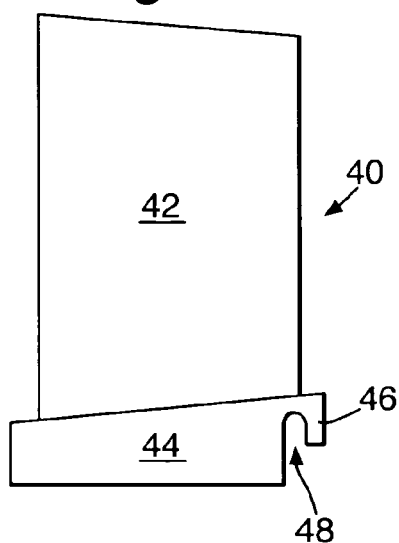
FIG. 2a illustrates a sectional side view of a rotor blade.
Figure 2B:
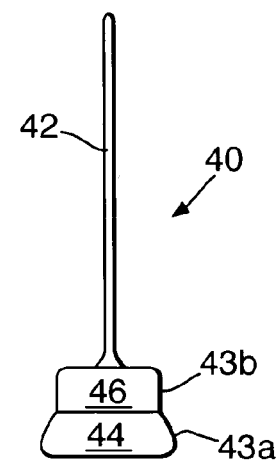
FIG. 2b illustrates an end view of a rotor blade.
Figure 3A:
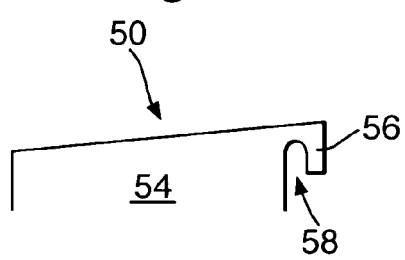
FIG. 3a illustrates a sectional side view of a supporting disc for receiving rotor blades.
Figure 3B:
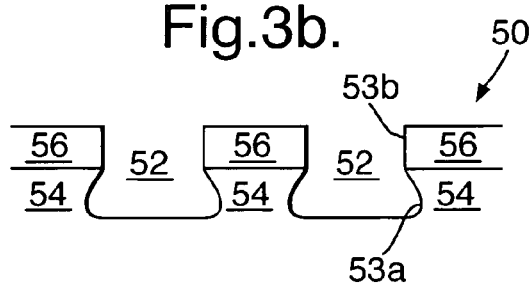
FIG. 3b illustrates an end view of a supporting disc for receiving rotor blades.
Figure 3C:
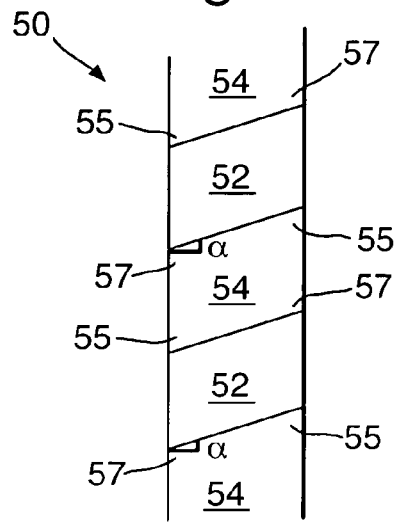
FIG. 3c illustrates a plan view of a supporting disc for receiving rotor blades.
Figure 4A:
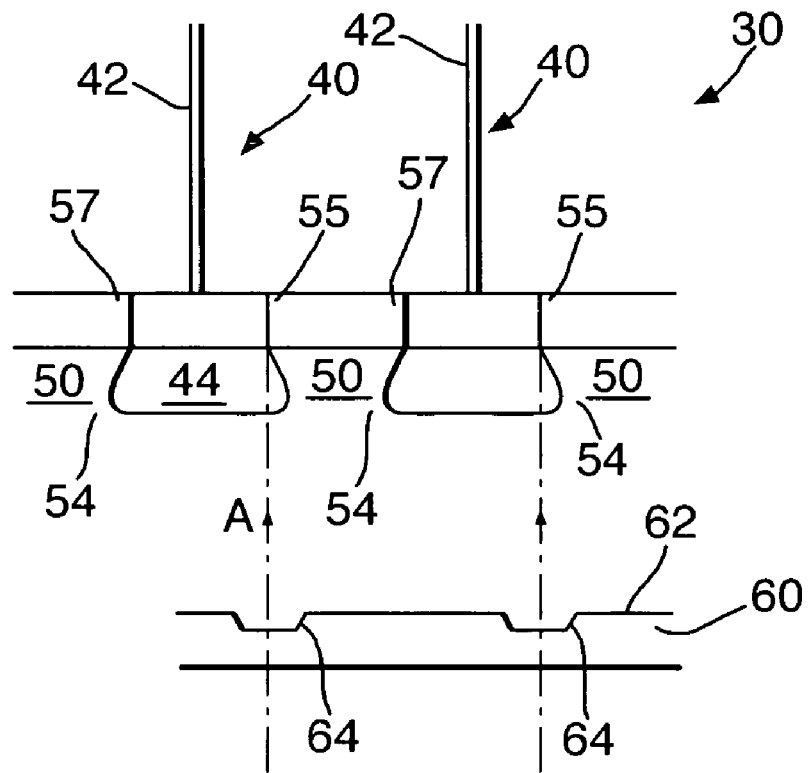
FIG. 4a illustrates, using an end view, the insertion of a retaining plate into a channel formed by slotting rotor blades into a supporting disc.

FIGS. 2a, 2b, 3a, 3b, 3c, 4a and 4b illustrate the components of a rotor 30 in more detail. The rotor 30 comprises a circular supporting disc 50 (illustrated in FIGS. 3a, 3b, 3c, and 4a); a plurality of rotor blades 40 (one of which is illustrated in FIGS. 2a, 2b, and 4a) slotted into the supporting disc and a retaining plate 60 (illustrated in FIGS. 4a and 4b).

The supporting disc 50 is circular and connected to a shaft for rotation about an axis through the centre of the circle and perpendicular to the plane of the disc. The supporting disc 50 supports radially extending rotor blades 40 slotted therein at regular distances around its circumference. The supporting disc 50 has a series of circumferentially arranged axially extending slots 52 separated by disc posts 54 for receiving the rotor blades 40. FIGS. 3a, 3b and 3c illustrate a radial extremity of a portion of a supporting disc. In these Figs the radially outer edge of the supporting disc, which is circular, is approximated to a straight line for clarity in the drawings. FIG. 3a illustrates a sectional side view. FIG. 3b illustrates an end view. FIG. 3c illustrates a plan view.

Each slot 52 extends axially at least part way through the supporting disc, and is skewed at the same angle a off axis. Each disc post 54 therefore has an obtusely angled (90+α degrees) portion 57 and an acutely angled (90−α degrees) portion 55. The off-axis angle α may be as much as 30 degrees.

Each disc post 54 has a body of width w with a rear retaining hook 56 at one axial extremity, that has the same width w and depends radially part-way towards the axis of the supporting disc 50. A channel 58 is formed between the rear retaining hook 56 and the body of the disc post. Each slot 52 has an enlarged interior portion 53a and a constricted opening 53b.

FIG. 2a illustrates a sectional side view of a rotor blade 40 and FIG. 2b illustrates an end view of the rotor blade 40. Each rotor blade 40 comprises an aerofoil 42 and a root portion 44 from which the aerofoil 42 extends. The root portion 44 has a cross-section substantially similar, but smaller, to the cross-section of the slots 52. The root portion 44 has a dovetail 43a at its base and a smaller platform 43b where the aerofoil joins. Thus an aerofoil 42 can be slotted by axial movement into the slot 52. The disc posts 54 on either side of the slot 52 define the constricted opening 53b of the slot 52 and prevent the movement of the rotor blade 40 in a radial direction.

The root portion 44 of each rotor blade 40 has a body portion of width W with a rear retaining hook 46, at a radial extremity, that has the same width W and points radially inwards. A channel 48 is formed between the rear retaining hook 46 and the body portion of the root portion 44.

The rotor 30 is assembled by slotting the rotor blades 40 into the slots 52 of the supporting disc 50 as shown in FIG. 4a. The disc posts 54 of the supporting disc 50 prevent radial movement of the rotor blades 40. The rear retaining hooks 46 of the rotor blades 40 and the rear retaining hooks 56 of the supporting disc 50 are aligned. The hooks 46, 56 combine to define one side wall of a single channel formed from channels 48, 58. The single channel extends lengthwise circumferentially all the way around the axis in the form of a closed circle.

A disc post 54 is contiguous with the root portion 44 of its adjacent rotor blades 40. Within the single channel, each disc post 54 is contiguous with a first neighbouring root portion 44 at a first portion 55 and is contiguous with a second neighbouring root portion 44 at a second portion 57. The first portion 55 of the disc post 54 is acutely angled. The second portion 57 of the disc post 54 is obtusely angled.

A plurality of retaining plates 60 are inserted into the single channel. The retaining plates prevent axial movement of the rotor blades 40 and reduce the air flow through the joint between the supporting disc 50 and the root portion 44. FIG. 4a illustrates, using an end view, the insertion (in direction A) of a retaining plate 60 into the single channel.

Figure 4B:
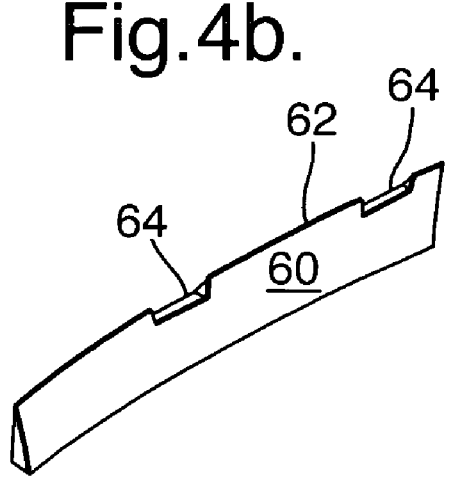
FIG. 4b illustrates a perspective view of a retaining plate.

FIG. 4b illustrates a perspective view of a retaining plate. The retaining plate 60 has a body with a radially outer edge 62. The radially outer edge 62 has regularly spaced indentations 64. Each indentation is the same. It has in this example a depth of 0.1 mm and a length of w/2 (half the width of a disc post 54). The radially outer edge 62 forms the arc of a circle with a recessed deviation from the arc of the circle at each of the indentations 64.

The indented retaining plate 60 is positioned as shown in FIG. 4a within the single channel. Each one of the indentations 64 is aligned with a first acutely angled portion 55 of a disc post 54 within the channel. Thus during operation of the rotor abutment cannot occur between the radially outer edge 62 of the retaining plate and the first acutely angled part 55 of the disc 50 because the radially outer edge 62 is indented at that location.

The indented retaining plates 60 are held in the correct position by retaining means such as lockstraps that pass through apertures in the supporting disc and aperture(s) in each of the indented retaining plates 60. The Jockstraps prevent circumferential slip of the indented retaining plates 60 and consequent misalignment of each indentation 64 with a first acutely angled portion 55 of the disc post 54.

When the rotor is operated, the rotor blades 40 and the indented retaining plates 60 have radial centrifugal forces operating on them. These forces place a radial stress upon the supporting disc 50 in the vicinity of the channel formed by the rear retaining hook 56. The stresses are concentrated at acutely angled portions of the supporting disc. Embodiments of the present invention reduce the radial tensile load upon the supporting disc 50 during operation of the rotor. The indented retaining plate 60 only loads up on a proportion of the post 54 close to the obtuse corner 57.

It has been found that stress at the acute corner 55 of the disc post 54 is reduced without adversely affecting the stress conditions elsewhere in the disc.

The life of the disc is therefore improved.

Although embodiments of the present invention have been described in the preceding paragraphs with reference to various examples, it should be appreciated that modifications to the examples given can be made without departing from the scope of the invention as claimed.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A rotor comprising: a disc having an axis about which to the disc rotates, the disc supporting a plurality of radially extending blades in slots therein, a channel being defined by the disc and at least one blade, the or each blade and the disc being contiguous in the channel at first and second distinct parts of the disc, and at least one retaining plate each having a radially outer edge, the radially outer edge having at least one indentation, and the or each indentation being aligned with a highly stressed region of the disc.

2. A rotor as claimed in claim 1, wherein, in use, the or each indentation is aligned with a first part of the disc.

3. A rotor as claimed in claim 1, wherein the radially outer edge is shaped so that, in use, abutment cannot occur between the radially outer edge and the first part of the disc.

4. A rotor as claimed in claim 1, wherein the channel extends lengthwise circumferentially along the arc of a circle.

5. A rotor as claimed in claim 1, wherein the channel is defined by slotting the plurality of blades into the slots of the disc.

6. A rotor as claimed in claim 1, wherein the slots are aligned off-axis.

7. A rotor as claimed in claim 1, wherein the first part of the disc is acutely angled.

8. A gas turbine engine including a rotor as claimed in claim 1.

* * * * *